US008727336B2

(12) United States Patent
Colston et al.

(10) Patent No.: US 8,727,336 B2
(45) Date of Patent: May 20, 2014

(54) CONDITION DETERMINING

(75) Inventors: Scott L. Colston, Dundee (GB); Douglas L. Milne, Dundee (GB)

(73) Assignee: NCR Corporation, Duluth, GA (US)

( * ) Notice: Subject to any disclaimer, the term of this patent is extended or adjusted under 35 U.S.C. 154(b) by 241 days.

(21) Appl. No.: 13/285,829

(22) Filed: Oct. 31, 2011

(65) Prior Publication Data

US 2013/0104628 A1 May 2, 2013

(51) Int. Cl.
*B65H 3/08* (2006.01)
*G01N 19/00* (2006.01)

(52) U.S. Cl.
USPC ............. 271/90; 73/865.9; 700/244; 700/301

(58) Field of Classification Search
CPC ............. B65H 3/0808; B65H 2515/34; G07D 11/0024; G07D 11/0006; G07D 11/0048
USPC ................. 271/90–108, 30.1–31.1; 73/865.9; 700/244, 301
See application file for complete search history.

(56) References Cited

U.S. PATENT DOCUMENTS

| | | | | |
|---|---|---|---|---|
| 4,513,957 | A * | 4/1985 | Schaefer, Jr. | 271/90 |
| 5,180,156 | A * | 1/1993 | Matsui et al. | 271/103 |
| 5,752,695 | A * | 5/1998 | Jehan et al. | 271/14 |
| 6,119,533 | A * | 9/2000 | Gherson et al. | 73/864.34 |
| 6,237,847 | B1 * | 5/2001 | Milne | 235/379 |
| 6,349,930 | B1 * | 2/2002 | Kruger et al. | 271/104 |
| 6,607,192 | B2 * | 8/2003 | Ono et al. | 271/90 |
| 7,232,059 | B2 * | 6/2007 | Peebles | 235/379 |
| 7,341,179 | B2 * | 3/2008 | Tocher et al. | 235/379 |
| 7,451,976 | B2 * | 11/2008 | Nam | 271/152 |
| 7,641,185 | B2 * | 1/2010 | Lyons et al. | 271/96 |
| 2007/0138733 | A1 * | 6/2007 | Gray | 271/18 |
| 2007/0145668 | A1 * | 6/2007 | Lyons et al. | 271/90 |
| 2007/0205260 | A1 * | 9/2007 | Tennant | 235/379 |
| 2013/0105505 | A1 * | 5/2013 | Leeper | 221/1 |

* cited by examiner

*Primary Examiner* — Randy W Gibson
*Assistant Examiner* — Natalie Huls
(74) *Attorney, Agent, or Firm* — Michael Chan

(57) ABSTRACT

A method and apparatus are disclosed for determining a condition at an item of media container. The method includes the steps of locating a suction element at a pick up region of a container, selectively connecting a source of negative pressure to the suction element, determining a pressure at the suction element, and determining a condition of the container responsive to the determined pressure.

11 Claims, 15 Drawing Sheets

CONDITION DETERMINING

FIELD OF THE INVENTION

The present invention relates to a method and apparatus for determining a condition at an item of media container. In particular, but not exclusively, the present invention relates to a method for determining when a container arranged to hold items of media such as currency notes is in an empty state or non-empty state.

BACKGROUND OF THE INVENTION

It is known that various types of container can be used to contain items of media. For example, a cassette or depository can be utilized to store flexible items of media such as, but not limited to, currency notes, checks, tickets, giros and the like.

Such media containers are often used in self-service terminals such as automatic teller machines (ATMs), vending machines, change machines and the like.

In such machines, it is important that when an item of media is to be removed from the container in which it is held, the item of media is removed without error.

Another problem when removing items of media from a container is that if the container becomes empty, this fact should be notified promptly to a user of the self-service terminal. An empty condition may also be signaled to a remote location to enable a service provider to refill the terminal so that service at the terminal can resume as soon as possible. Also, a user of the terminal is notified promptly which avoids wasted time and thus provides the user with an improved quality of service.

Certain solutions have been proposed to overcome these and other related problems, for example, multiple sensors can be provided in or close to the container to determine when the container is empty or is about to become empty. However, the cost of such sensors is often relatively substantial and the sensors and circuitry required to operate them can be prone to error. Also, the sensitivity of the sensors is questionable and on occasion false condition signals can be generated when the items of media which are to be removed do not entirely match expected item parameters. For example, when the items of media are in sheet form those sheets may include one or more small or large through holes such as perforations or slits which can lead to false readings being generated.

Another related problem is that the containers used to hold the items of media often include a pusher plate which is utilized to urge the items of media in the container into a pick up region where the items may be removed. On occasion, this pusher plate mechanism can become stuck or fail to operate in a predictable manner. Such non-ideal operation can lead to the false diagnosis of an empty container if items of media still in the container are not presented correctly at an expected pick up region.

SUMMARY OF THE INVENTION

It is an aim of the present invention to at least partly mitigate the above-mentioned problems.

It is an aim of certain embodiments of the present invention to provide a method and apparatus for accurately determining a condition of an item of media container.

It is an aim of certain embodiments of the present invention to provide a method and apparatus for determining when a container of items of media is empty or when a perforated item of media is presented to be picked next or when a non-perforated item of media is present and ready to be picked.

It is an aim of certain embodiments of the present invention to provide a method and apparatus which can help ensure that false readings are avoided or the risk of false readings is minimized by determining if a pusher plate used in the container is stuck prior to drawing any conclusions as to the contents of a container.

According to a first aspect of the present invention there is provided a method for determining a condition at an item of media container, comprising the steps of:

- locating a suction element at a pick up region of an item of media container;
- selectively connecting a source of negative pressure to the suction element;
- determining a pressure at the suction element; and
- determining a condition of the container responsive to the determined pressure.

Aptly, said step of determining a condition comprises determining one of a plurality of possible conditions, said possible conditions comprising an empty condition or a perforated item of media present condition or a non-perforated item of media present condition.

Aptly, said step of determining pressure at the suction element comprises:

- determining a maximum pressure between a first and second predetermined time; and
- comparing said maximum pressure to at least one predetermined threshold pressure.

Aptly, said step of determining pressure at the suction element comprises:

- providing a respective integrated value or sum value by integrating or summing the determined pressure between a first and second predetermined time; and
- comparing the integrated value or sum value to at least one predetermined threshold value.

Aptly, the method further comprises determining if an item of media container is in a low content state; and

- only determining said a condition if the item of media container is in the low contents state.

Aptly, the method further comprises, if the container is in the low contents state, prior to determining said a condition, urging said suction element and/or a pick arm carrying said suction element in a direction towards a pusher plate in said container until a contents state sensor no longer indicates that the container is in the low contents state.

Aptly, the method further comprises:

- locating a pick up arm carrying said suction element from a rest position to a pick position in which the suction element is located at said pick up region;
- switching on a vacuum pump to thereby provide a source of negative pressure; and
- subsequently opening a valve element to thereby selectively connect the source of negative pressure and the suction element.

Aptly, the method further comprises:

- the item of media container is a currency cassette or sheet depository in an automatic teller machine (ATM) and said a condition comprises determining if the cassette or depository is empty, or if a perforated currency note is next to be picked in the cassette or depository, or if at least one complete currency note is available to be picked.

According to a second aspect of the present invention there is provided a product which comprises a computer program comprising program instructions for causing a computer to locate a suction element at a pick up region of an item of media container;

causing a computer to selectively connect a source of negative pressure to the suction element;

causing a computer to determine a pressure at the suction element; and causing a computer to determine a condition of the container responsive to the determined pressure.

According to a third aspect of the present invention there is provided apparatus for determining a condition at an item of media container, comprising:

an item of media container for containing at least one item of media;

a suction element locatable at a pick up region of the container and selectively connectable to a source of negative pressure;

at least one pressure sensor that determines pressure at the suction element; and a comparator element for determining a condition of the container responsive to the determined pressure.

Aptly, the apparatus further comprises at least one container contents state sensor that determines if the container is in a low contents state.

Aptly, the apparatus further comprises the at least one pressure sensor is located between said source of negative pressure and said valve element.

Aptly, the apparatus further comprises a pressure logger that stores a measured value pressure at least for a time period between a first and second predetermined time.

Aptly, the apparatus further comprises a summer that sums the logged pressure during said a time period and/or an integrator that integrates the logged pressure during said a time period.

Certain embodiments of the present invention provide the advantage that the condition of an item of media container can be determined without extra dedicated sensors being needed to carry out the task which, in addition to their cost, can be prone to error.

Certain embodiments of the present invention provide the advantage that a range of conditions for the container may be determined. Such a range is broader than that previously possible and this can lead to a reduction in false readings regarding the condition of the container as well as more generally providing useful data.

Certain embodiments of the present invention provide the advantage that a stuck pusher plate in the container can be identified and released automatically and without any false empty container signals being generated.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
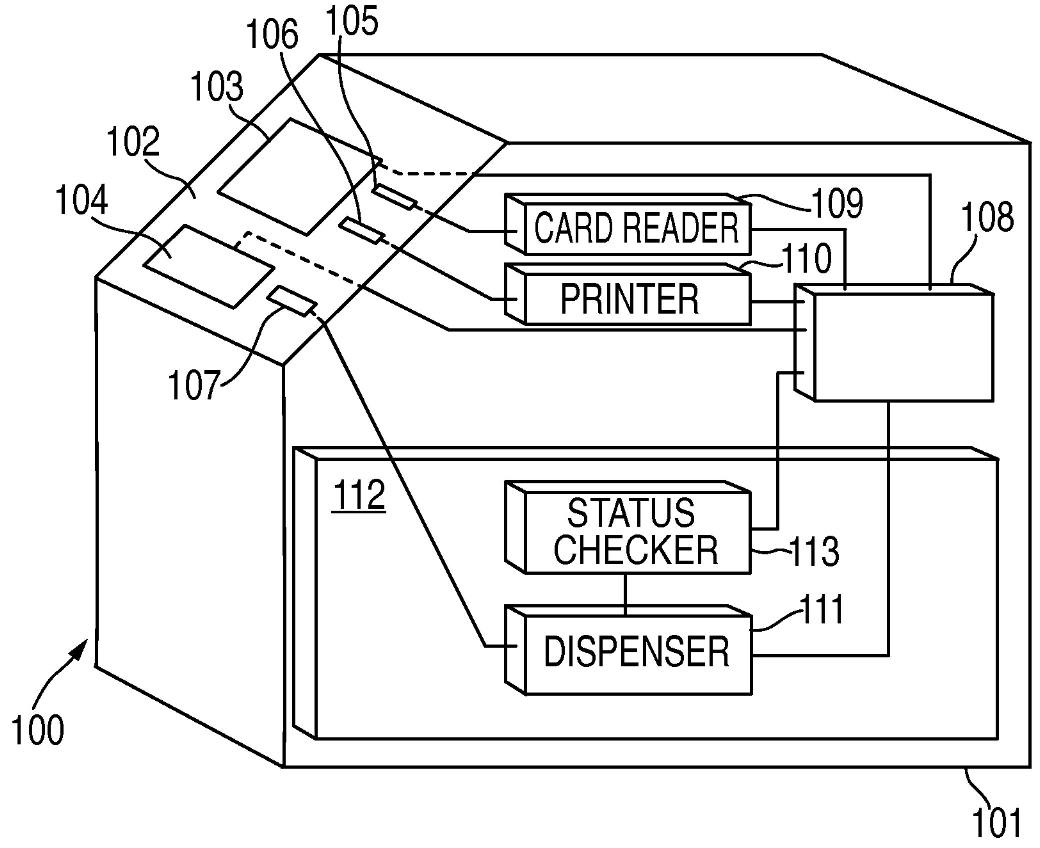
FIG. 1 illustrates an ATM according to an embodiment of the present invention.

In the drawings like reference numerals refer to like parts.

FIG. 1 illustrates an automatic teller machine (ATM) 100. It will be understood that embodiments of the present invention are not restricted to ATMs but are more generally applicable to self-service terminals such as ATMs, vending machines, change machines and the like. The ATM has a housing 101 with a front fascia 102 that has a user interface including a screen 103 for presenting financial information to a customer and a keyboard 104 for receiving user input. A card slot 105 is also provided for receiving a customer's card and a print-out slot 106 is provided through which printed material is dispensed. A dispensing slot 107 is provided for dispensing currency notes. Optionally, the slot 107 can be utilized to receive currency notes or other items of media. It is to be understood that embodiments of the present invention can be utilized for a broad range of items of media. For example, the items of media can include, but are not limited to, flexible items, sheet items, currency notes, checks, tickets, giros and the like.

Included in the ATM housing is a control module 108 which is operable to control access to a banking network and any financial transactions. The control module is connected to each of a card reader mechanism 109 that is aligned with the card slot 105, a printer module which is aligned with the print-out slot 106 and a dispensing module 111 which is aligned with the dispensing slot 107.

Information read from the card by the card reader module 109 can be transmitted to the control module 108 for further processing. The printer module 110 is operable to print out financial information, such as bank statements, receipts or the like under the control of control module 108. The dispensing mechanism 111 is located within a secure enclosure 112, and includes currency cassettes storing currency notes. The dispensing mechanism 111 is operable to dispense currency notes responsive to commands received from the control module 108.

The ATM also includes a cassette status check control module 113 (also located within the secure enclosure 112) which can be utilized to determine a condition at an item of media. For example, the condition may be a cassette empty condition or a pusher stuck condition or a perforated item condition or a non-perforated item condition or the like. This is described herein below in more detail.

Figure 15:
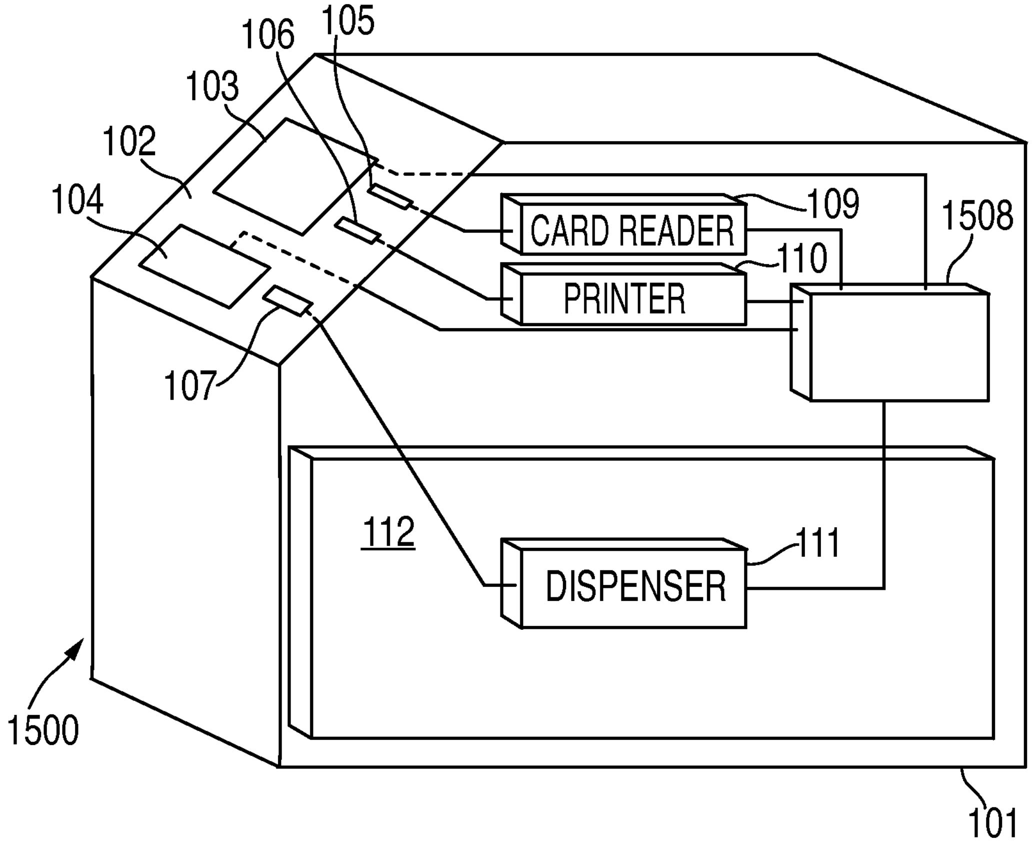
FIG. 15 illustrates an ATM according to an alternative embodiment of the present invention.

It will be understood that whilst the cassette status check control module 113 and control module 108 are shown as separate units the functionality of the check status module may be provided by the control module. This is illustrated in FIG. 15.

The control module 108 and optional check status module 113 each operate as computers. That is to say they are programmable machines which can sequentially and automatically carry out a sequence of arithmetic or logical operations. Additionally, they can receive and send signals that control the operation of the various units of the self-service terminal. Certain embodiments of the present invention include a computer program product which may be directly loadable into the internal memory of such a digital computer and which includes software code which when executed causes the ATM to operate as herein described.

Figure 2:
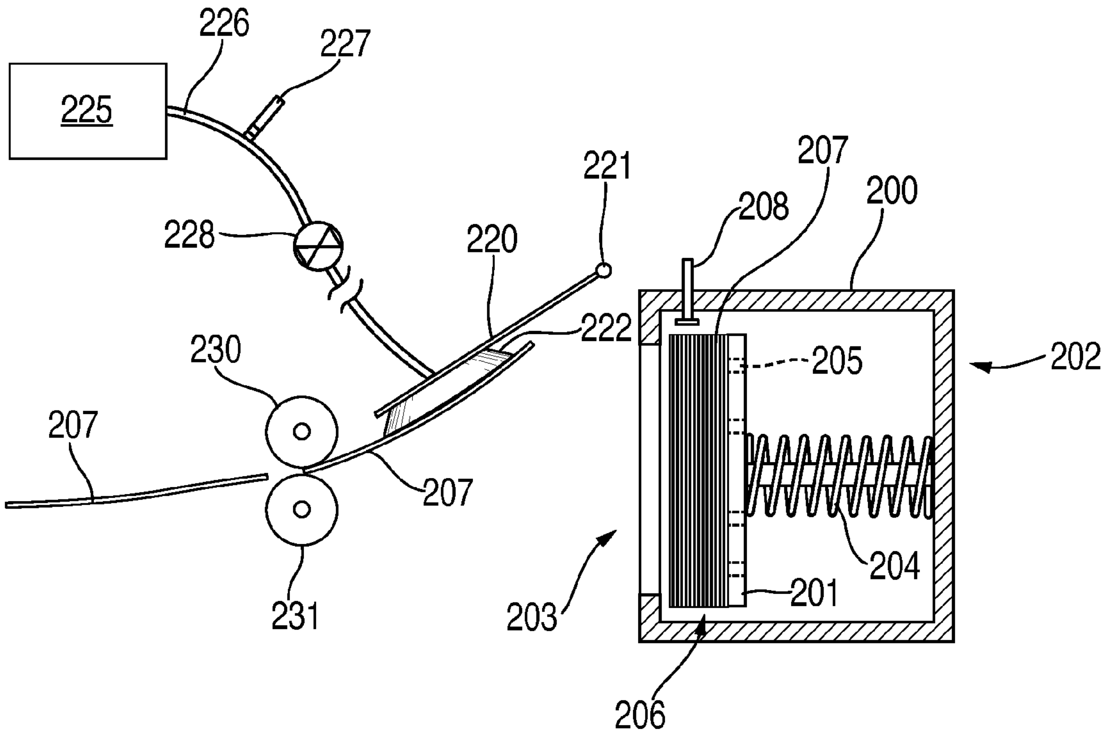
FIG. 2 illustrates the pick up of items of media from an item of media container.

FIG. 2 illustrates a container 200 in a secure enclosure 112, together with selected parts of a dispensing mechanism located in the dispenser 111. The parts selected and shown in FIG. 2 are chosen only by way of explanation. As illustrated in FIG. 2, the container 200 includes a pusher plate 201 which is constantly urged from a back wall side 202 of the container towards an open pick up region 203. A spring 204 or other such resilient mechanism may be utilized to provide a constant urging force. Optionally, instead of a constant urging biasing mechanism, the pusher plate 201 may be mechanically driven at certain times. The pusher plate 201 may be a solid plate or, optionally, as illustrated in FIG. 2, may include one or more (four shown) through holes 205. The purpose of the through holes will be explained in more detail hereinafter.

Also illustrated in FIG. 2 is a stack 206 of separate and individual currency notes 207. The currency notes are items of media which are stored temporarily in the container 200 and thereafter selectively removed one by one to thereafter be dispensed through the dispensing slot 107 of the ATM. A sensor 208 senses the presence of the stack 206 of currency notes and pusher plate 201. The sensor 208 is a pressure sensor although it will be appreciated that alternative types of sensor such as a pressure transducer or light sensitive detector or the like may be utilized to determine when a stack or pusher plate is present, as will be appreciated by those skilled in the art.

FIG. 2 also illustrates how a pick lever 220 is located proximate to the open pick up region 203 of the container 200. The pick up lever 220 is rotatable selectively about a pivot point 221 located at an end of the lever. The pick up lever 220 may be rotated clockwise or anti-clockwise as desired about the pivot point 221 responsive to drive signals produced by the control module 108. The pick up lever 220 carries with it a suction cup 222. The suction cup 222 is formed of resilient material such as rubber or the like which is flexible and deformable so that in a pick mode of operation when the lever 220 is rotated anti-clockwise, the suction cup 222 can be urged against an outermost currency note in the container 200.

The outermost note is an elected item in the sense that it is the very next item of media to be picked from the container. As the suction cup 222 is urged against the outer surface of the currency note, the suction cup 222 will deform to create a seal thus forming an enclosed region within the cup 222 and the outer surface of the elected currency note. A vacuum pump 225 provides a source of negative pressure and this is connected via a single lumen tube 226 to the pick up lever 220 and is in fluid communication with the suction cup. The vacuum pump 225 thus provides a pressure lower than atmospheric pressure. A pressure sensor 227 such as a pressure transducer or the like is connected to the single lumen tube 226. A valve 228 is located in the fluid path between the vacuum pump 225 and the suction cup 222. The valve 228 is responsive to an open and close input signal and in the closed mode of operation the vacuum pump 225 is connected only to the relatively short length of tube between the vacuum pump and the valve 228. In an open mode of operation in which the valve 228 is selectively opened, the vacuum pump is in fluid communication with the suction cup 222 via a further length of the tube. Thus, in a closed mode of operation the pressure sensor 227 operates to determine a negative pressure generated by the vacuum pump whilst in an open mode of operation the pressure sensor effectively determines a pressure at the suction cup.

In normal operation, when one or more currency notes are to be dispensed, the pick lever 220 is driven anti-clockwise so that the suction cup 222 is urged against the elected currency note in the container. The vacuum pump 225 is energized and the valve 228 opened to produce a negative pressure within the suction cup 222. Because of the sealed relationship between this and the elected currency note, the currency note is thereby effectively secured to the pick lever 220. The pick lever 220 is then driven clockwise about the pivot point 221 taking the elected item of media with it. The elected currency note carried by the pick lever 220 is then presented between a first nip roller 230 and a further opposed nip roller 231. Each of the nip rollers 230,231 is a driven roller so that when an end of a currency note is presented therebetween, the nip rollers 230,231 pull the currency note away from the pick lever 220. Optionally, the pressure in the suction cup 222 is timed to release by closing the valve 228 or optionally turning off pump 225 close in time or simultaneously with the nip rollers 230,231 removing the currency note. Optionally, only one of the nip rollers 230,231 may be driven. The nip rollers 230,231 may be independently or simultaneously driven.

Figure 3:
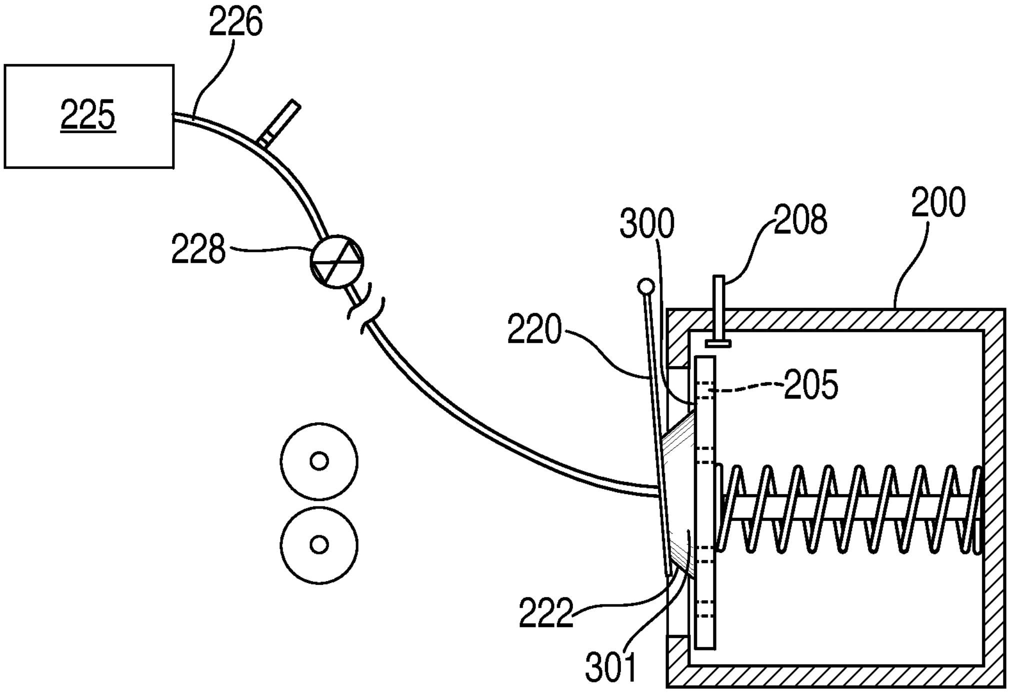
FIG. 3 illustrates the pick up of items of media from an item of media container.

FIG. 3 illustrates operation of the container and pick up lever in an empty condition. That is to say, when there are no more currency notes or other such items of media in the container 200. As illustrated in FIG. 3, in an empty condition the pusher plate 201 is located at the pick up region 203. An outer surface 300 of a pusher plate is thus an outermost surface presented to the suction cup 222 carried by the pick up lever 220 when a pick up operation is carried out.

As illustrated in FIG. 3, when the currency stack 206 in the container is almost or wholly depleted, the space taken up by the stack and pusher plate diminishes. A sensor 208 detects the fact that the currency stack is close to being depleted or wholly depleted. The sensor 208 signals this so that the cassette low sensor 208 output becomes active. Although illustrated in FIG. 3 with no currency notes present, the cassette low sensor actually activates prior to the stack being wholly depleted. For example, but not exclusively, the cassette low sensor becomes active when twenty currency notes or less are present which corresponds to the pusher plate being a predetermined distance from the pick up region 203 of the container. Aptly, the cassette low sensor indicates when ten or less currency notes are left in the container.

As illustrated in FIG. 3, when there are no currency notes present and the pick up lever 220 is driven in a pick up mode of operation the suction cup 222 is driven against the outer surface 300 of the pick up plate. The through holes 205 in the pick up plate are provided so that the negative pressure that can be generated in the enclosed region 301 within the suction cup is limited. That is to say, when the vacuum pump 225 is initiated and the valve 228 opened, the pump attempts to establish a pre-determined negative pressure in the enclosure 301. One or more through holes in the pusher plate effectively provide a leak path so that the negative pressure value which can be attained when there are no currency notes present is less than a negative pressure which can be attained and maintained when a currency note or more than one currency notes are contained in the container. Typically, currency notes provide a complete sealing surface to entirely close the open mouth of the suction cup 222. It will be appreciated that on occasion one or more small perforations or tears may accidentally be carried by the body of the currency note. Such perforations have a noticeable effect on the negative pressure which can be attained in the enclosure 301. However, the attained pressure and the manner in which the pressure is attained and then maintained, is different from the negative pressure which can be generated and maintained when the suction cup is urged against the pusher plate which has the pre-provided through holes 205.

Figure 4:
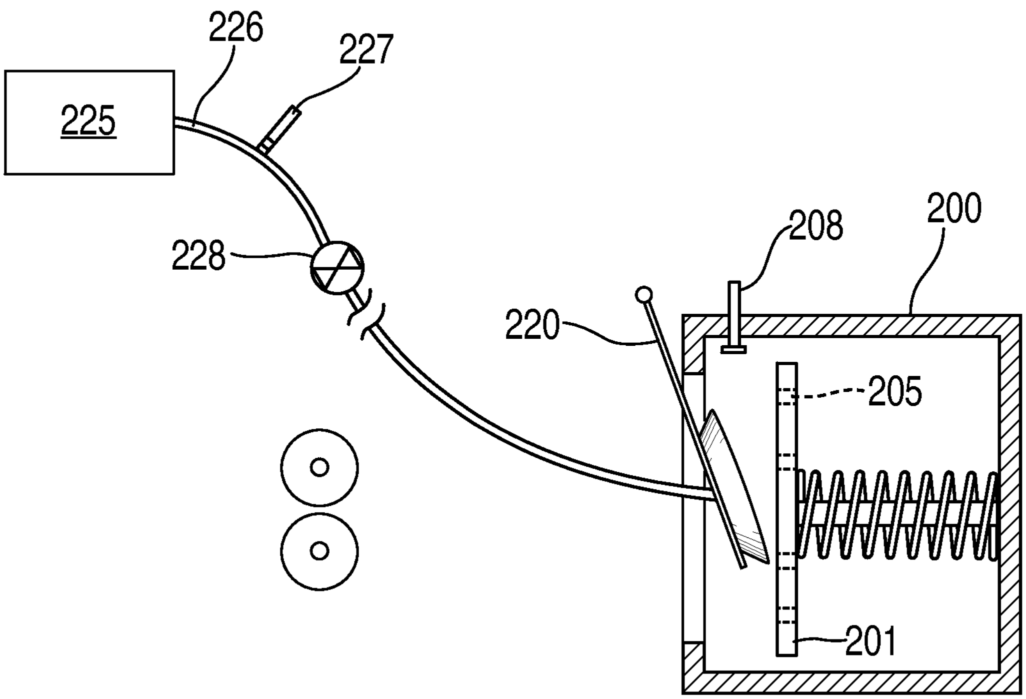
FIG. 4 illustrates the pick up of items of media from an item of media container.

FIG. 4 illustrates the container 200 and pusher plate 201 when the currency notes in the container 200 have been wholly depleted. The configuration illustrated in FIG. 4 may be established under two conditions. One condition is when the biaising mechanism 204 no longer works in a satisfactory condition and the pusher plate effectively becomes stuck in the container. Such a pusher plate stuck condition may of course also occur when one or more currency notes are still present in the container. However, in FIG. 4 no such currency notes are illustrated. Alternatively, the configuration illustrated in FIG. 4 may be observed when a currency stack is wholly depleted and the pusher plate mechanism 201 is working correctly. In such an instance, it is helpful to be able to optionally determine if a currency stack is wholly depleted or whether a pusher plate is stuck. The latter option can be identified by urging the pick lever 220 more anti-clockwise than that illustrated in FIG. 3. In this way, the suction cup 222 and/or a portion of the pick lever 220 are urged against the outer surface 300 of the pusher plate or the outer surface of any currency notes carried by the pusher plate. The pick lever is driven anti-clockwise and provides a force which overcomes the biaising force generated by the resilient urging spring 204. The effect of this is that the pusher plate is effectively pushed further back into the container. At some point in time the cassette low sensor 208 will detect that the pusher plate and any currency notes carried therewith are moved beyond a position which would otherwise be indicative of a cassette low condition. This is identified by observing the cassette low sensor signal which moves from an active value to an inactive value.

Figure 5:
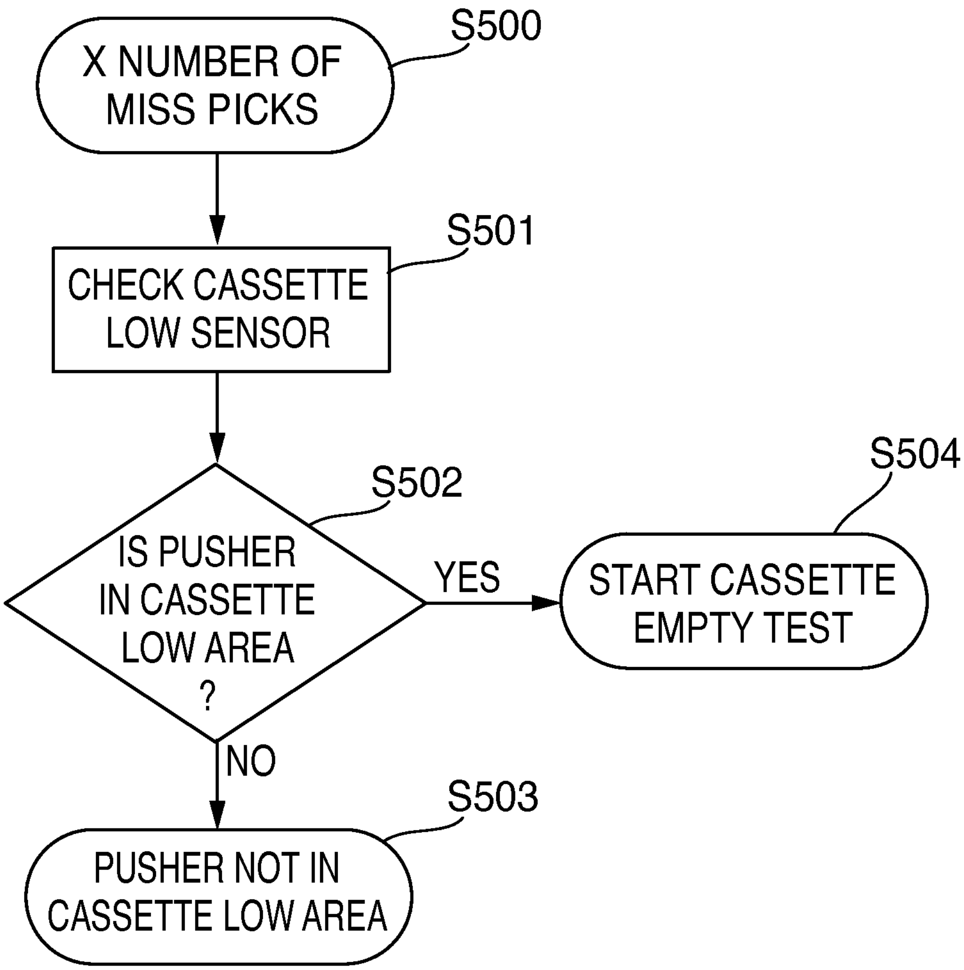
FIG. 5 illustrates initiation of a container empty test.

FIG. 5 illustrates the steps in determining if a cassette low status is determined and thereafter optional test steps. Optionally, the cassette low test 500 is initiated only after a predetermined number of missed attempts to pick a currency note have been carried out. This is illustrated by step S500. For example, if two or more attempts have been made to pick a currency note then a check is made on the cassette low sensor 208. Alternatively, the check cassette low sensor status can be continually monitored. The step of checking the cassette low sensor output to see whether this is active or inactive is illustrated at step S501. At step S502 a determination is made as to whether the pusher in the container 200 is in a location indicative of the fact that the container is almost or wholly empty. If the output from the check cassette low sensor 208 is not indicative of the fact that the pusher is in the container low area, then it may be concluded that the pusher 201 is stuck. This is illustrated at step S503. If it is concluded that the pusher is in the region of the container indicating that the container is almost or wholly empty of currency notes, then a cassette empty test sequence can be initiated as shown in step S504. This will help establish whether or not the container is in fact partially or wholly empty.

Figure 6A:
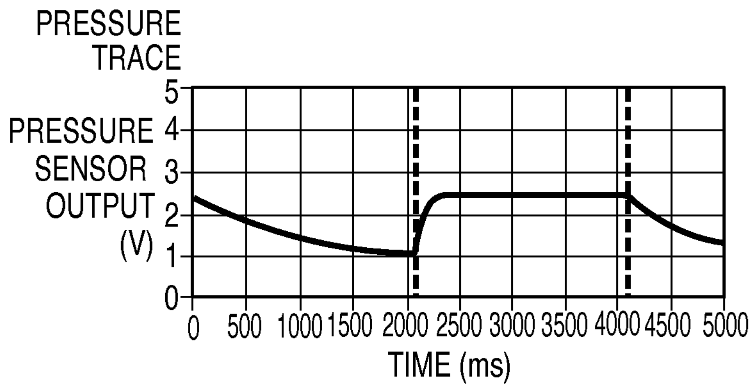
FIG. 6 illustrates pressure readings in an empty container condition.
Figure 6B:
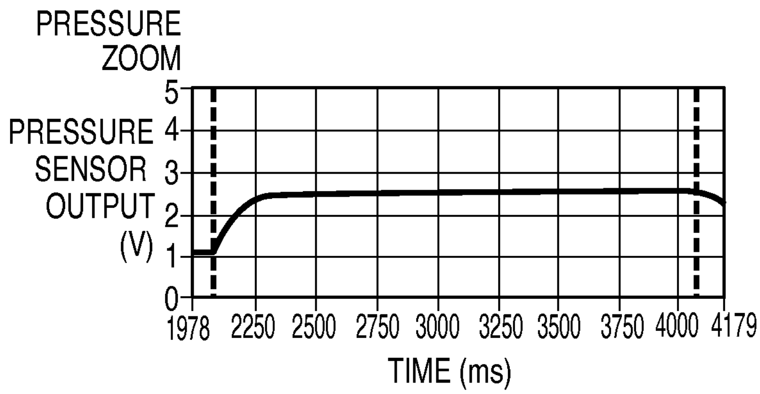
Figure 6C:
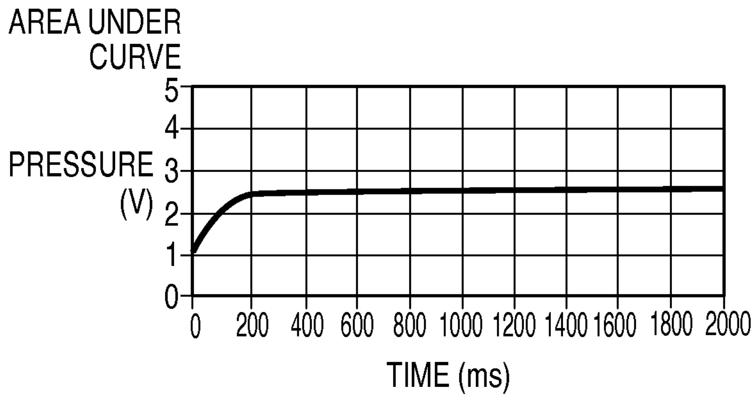

FIG. 6 illustrates how the pressure in the lumen 226 measured by the pressure sensor 227 varies during a pick mode of operation if the container is wholly empty of currency notes. FIGS. 6*a*, 6*b* and 6*c* illustrate various readings which can be made or operations carried out responsive to the measured pressure. The pressure monitored by the pressure sensor 227 varies over time when the currency note container is empty. During an initial phase illustrated between the approximate times 0 and 2000 milliseconds, the vacuum pump 225 is turned on and the valve 228 is closed. Over that period, the negative pressure measured by the pressure sensor 227 drops as negative pressure is established in the short length of tube between the valve 228 and the pressure pump. At some predetermined time later, for example around time 2000 milliseconds, the valve 228 is opened. Because there is no currency note present to seal the open mouth of the pick up suction cup and because the pick up plate 201 includes through holes 205, the negative pressure drops quickly over time back to almost atmospheric pressure. Effectively, a leak path is introduced so that the tube attains atmospheric or almost atmospheric pressure regardless of the work rate of the pump 225. Shortly after some pre-determined time, for example 4000 milliseconds, the valve 228 is closed. With the pump still running prior to its subsequent switch off, the negative pressure in the short length of tube between the valve 228 and the vacuum pump again begins to reduce towards the negative pressure attainable by the vacuum pump 225.

FIG. 6*b* illustrates the portion of the trace shown in FIG. 6*a* between the valve opening and valve closing points in time in more detail.

FIG. 6*c* illustrates an area under the trace illustrated in FIG. 6*b*. It will be understood by those skilled in the art that the area under the trace can effectively be determined by integrating the measured pressure over time. The integration may be carried out between the time when the valve is opened and the valve is closed. Alternatively, other pre-determined moments in time may be selected to limit the integration calculation.

Figure 7A:
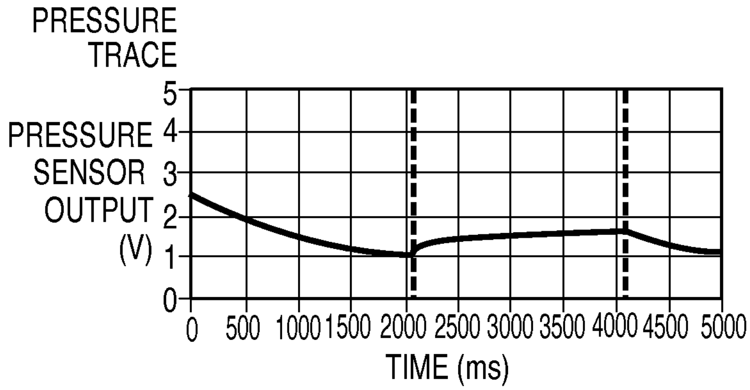
FIG. 7 illustrates pressure readings in a perforated item present condition.

FIG. 7 illustrates an alternative pressure reading which is typical of the situation when a currency note is present in the container but that currency note includes one or more small perforations. The small perforations effectively introduce one or more small leak paths into the negative pressure system. As shown in FIG. 6*a* during an initial time period the pump 225 is switched on with the valve 228 closed. The pressure measured by the pressure sensor 227 thus begins to drop according to the negative pressure attainable by the negative pressure source 225. Shortly after the time 2000 milliseconds the valve is opened. Because of the small perforations, the pump 225 is not able to maintain the negative pressure at the previous low pressure level. However, the maintained pressure does not rise to atmospheric conditions as per the condition illustrated in FIG. 6. Instead, the negative pressure is maintained at a low pressure state which gradually degrades towards atmospheric pressure over time. As illustrated in FIG. 7*a* at a further moment in time shortly after 4000 milliseconds the valve 228 is closed. At this moment in time the vacuum pump which is still operating begins to pump down the short length of pipe between the valve and the pump and thus the pressure measured again begins to drop again towards the lowest negative pressure attainable by the pump.

Figure 7B:
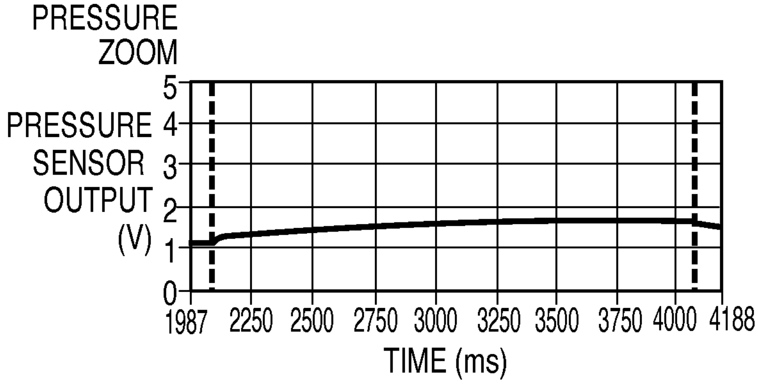

FIG. 7*b* illustrates the portion of the pressure trace shown in FIG. 7*a* between the valve on and valve off time.

Figure 7C:
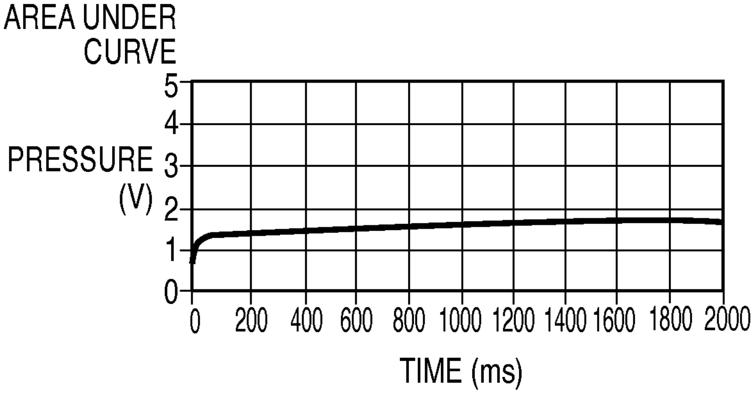

FIG. 7*c* illustrates an integrated value of the pressure trace shown in FIG. 7*b*. That is to say, the area under the pressure trace. It will be appreciated that this area or integrated value is less than that of FIG. 6*c*.

Figure 8A:
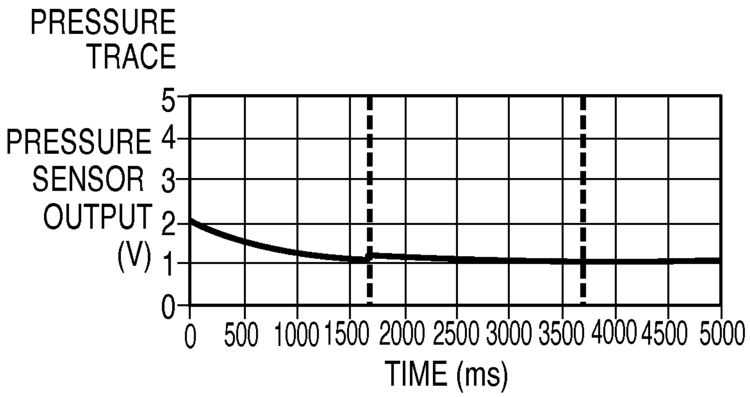
FIG. 8 illustrates pressure readings in a whole item present condition.

FIG. 8 illustrates a pressure trace and area similar to that shown in FIGS. 6 and 7, however with an elected currency note present in the container which is not perforated, that is to say, a whole currency note. As illustrated in FIG. 8, during an initial mode the valve 228 is closed and the vacuum pump 225 is switched on. The pressure measured by the pressure sensor 227 thus begins to drop to a negative pressure attainable by the vacuum pump 225. At a pre-determined moment in time shortly after 1500 milliseconds the valve 228 is opened. The negative pressure measured initially drops somewhat due to the volume of tube between the valve 228 and suction cup and the volume of the enclosure 301 formed between the suction cup and the whole currency note elected to be picked. However, because this whole currency note is a complete note, the open mouth of the suction cup 222 is sealed and thus, the negative pressure quickly begins to drop again to the value which is attainable by the vacuum pump. The tube 226 and enclosure 301 are thus effectively a sealed system. As illustrated in FIG. 8*a*, when the valve 228 is closed there is effectively little difference in the measured pressure between that measured with the currency note in place and the valve open and the negative pressure which can be attained in the short length of tube between the valve 228 and the suction pump 225.

Figure 8B:
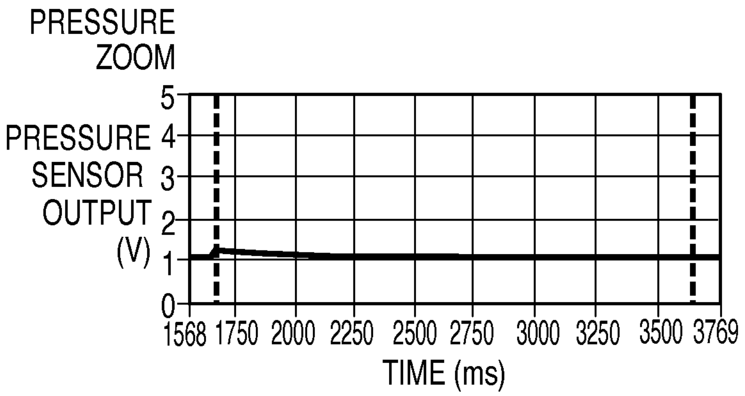

FIG. 8*b* illustrates a portion of the pressure trace shown in FIG. 8*a* between the valve open and valve close moments in time.

Figure 8C:
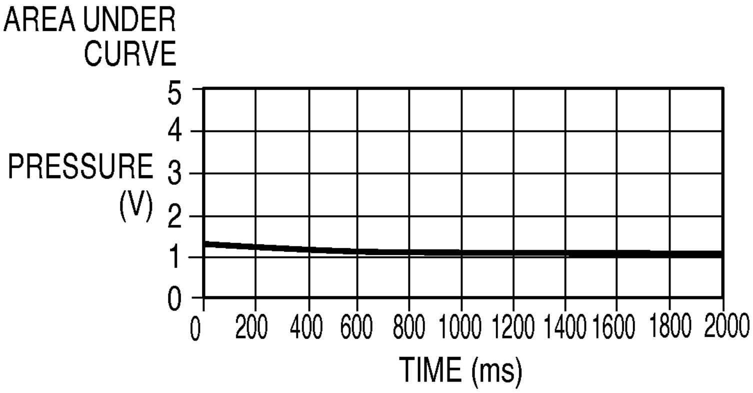

FIG. 8*c* illustrates the area under the pressure trace shown in FIG. 8*b* which may be formed by integrating the pressure between respective moments in time.

Figure 9:
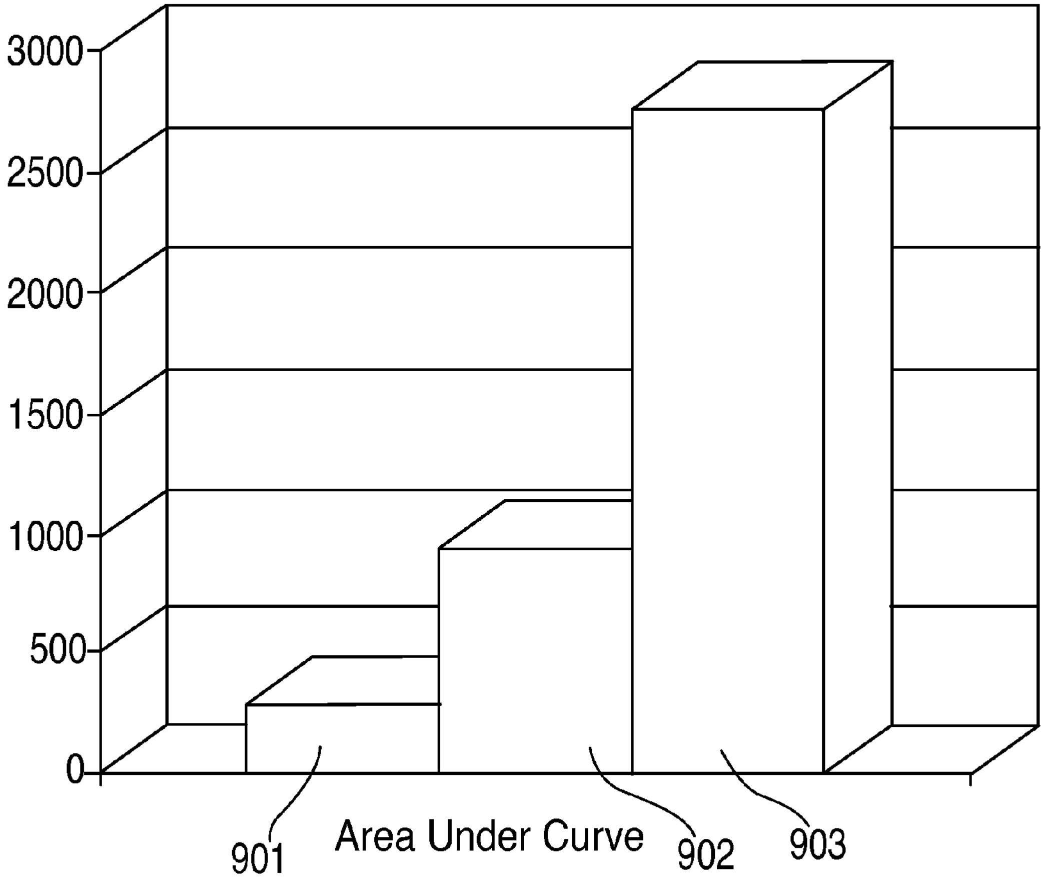
FIG. 9 illustrates three threshold values.

FIG. 9 illustrates the values for the area under the curves shown in FIGS. 6, 7 and 8 in more detail. The smallest area under the curve, that is to say the smallest integrated value is illustrated by column 901. This corresponds to a whole currency note being present condition. The next column 902 along is of slightly higher value, indicating a higher area under the pressure trace. This is indicative of a currency note being present, however, that currency note including one or more perforations. The third column 903 along shown in FIG. 9 corresponds to a highest area under the pressure trace, as per FIG. 6. This is indicative of a pick mode of operation when an attempt to pick up a currency note has been attempted but the container is empty. That is to say, there are no currency notes in the container.

Figure 10:
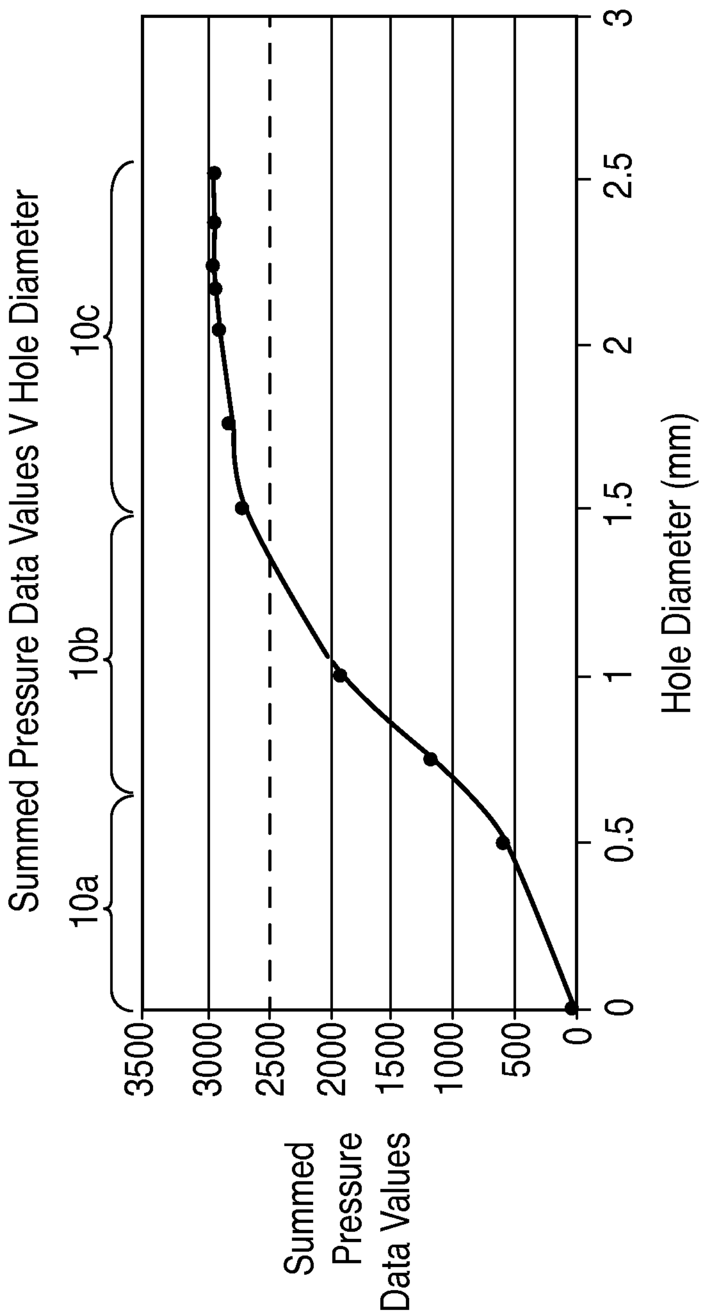
FIG. 10 illustrates how hole diameter may be determined.

Optionally, the pressure between a first and second pre-determined point in time, for example when the valve 228 opens and when the valve 228 closes can be summed and that summed pressure value will vary dependent upon the effective whole diameter of holes presented in either an outermost item of media or, if no item of media is present, by the through holes 205 in the pusher plate. As illustrated in FIG. 10, if there are no effective holes, that is to say, at least one whole currency note is carried by the pusher plate, the negative pressure can be generated and maintained at a low pressure between the two sample times. As a result, the overall summed pressure value is very low. As the hole diameter increases, by introducing a single hole in a currency note with a diameter of 0.5 mm or by having an empty container and a pusher plate having a through hole of diameter 0.5 mm, the summed pressure value increases. The negative pressure that can be maintained over time reduces as the vacuum leaks and pressure increases upwards to atmospheric pressure. The summed value thus begins to increase. The curve includes a first region 10*a* in which the summed pressure value increases relatively little as hole diameter increases and then an intermittent region 10*b* in which an almost linear increase in summed pressure value is identified as the effective hole diameter as presented by an elected item of media or, if the container is empty, the pusher plate. In a third region 10*c* in which the summed pressure value effectively plateaus. This plateau region which, illustrated in FIG. 10, may occur with an effective hole diameter of 1.5 mm or more corresponds to a pumping power of the vacuum pump and beyond a certain point the vacuum pump is unable to generate any negative pressure. Thus, whether or not the hole diameter is 1.5 mm or greater is difficult to determine.

Figure 11:
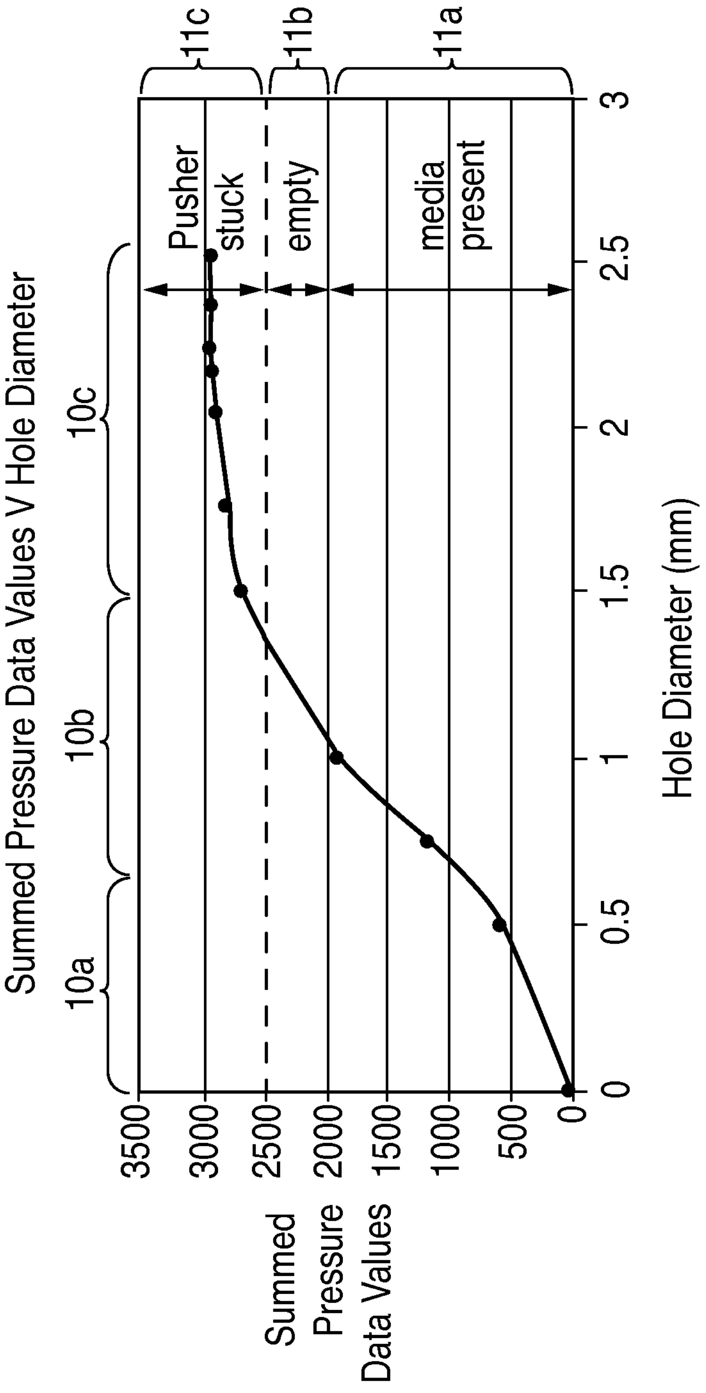
FIG. 11 illustrates how different conditions may be surmised.

FIG. 11 illustrates how the summed pressure value may be utilized to indicate a condition. For example, with a summed pressure value within about around 2000, that is to say within region 11*a*, it can be determined that a media is present. That is to say, at least one currency note is present in the container. In an intermediate range 11*b*, which corresponds to an effective hole diameter between about around 1 and 1.5 mm it can be determined that the container is empty but that the pusher is working effectively. It is in this range that the summed pressure is approximately equal to the summed pressure expected by virtue of the known hole sizes in the pusher plate. With the summed pressure value in a third range illustrated by 11*c*, the summed pressure value indicates that the pusher is stuck. That is to say, there is very little or no material closing the open mouth of the suction cup. Because the suction cup is so open there is a complete or almost complete leak path, meaning that no negative pressure can be attained and maintained and thus the summed pressure value is high.

Figure 12:
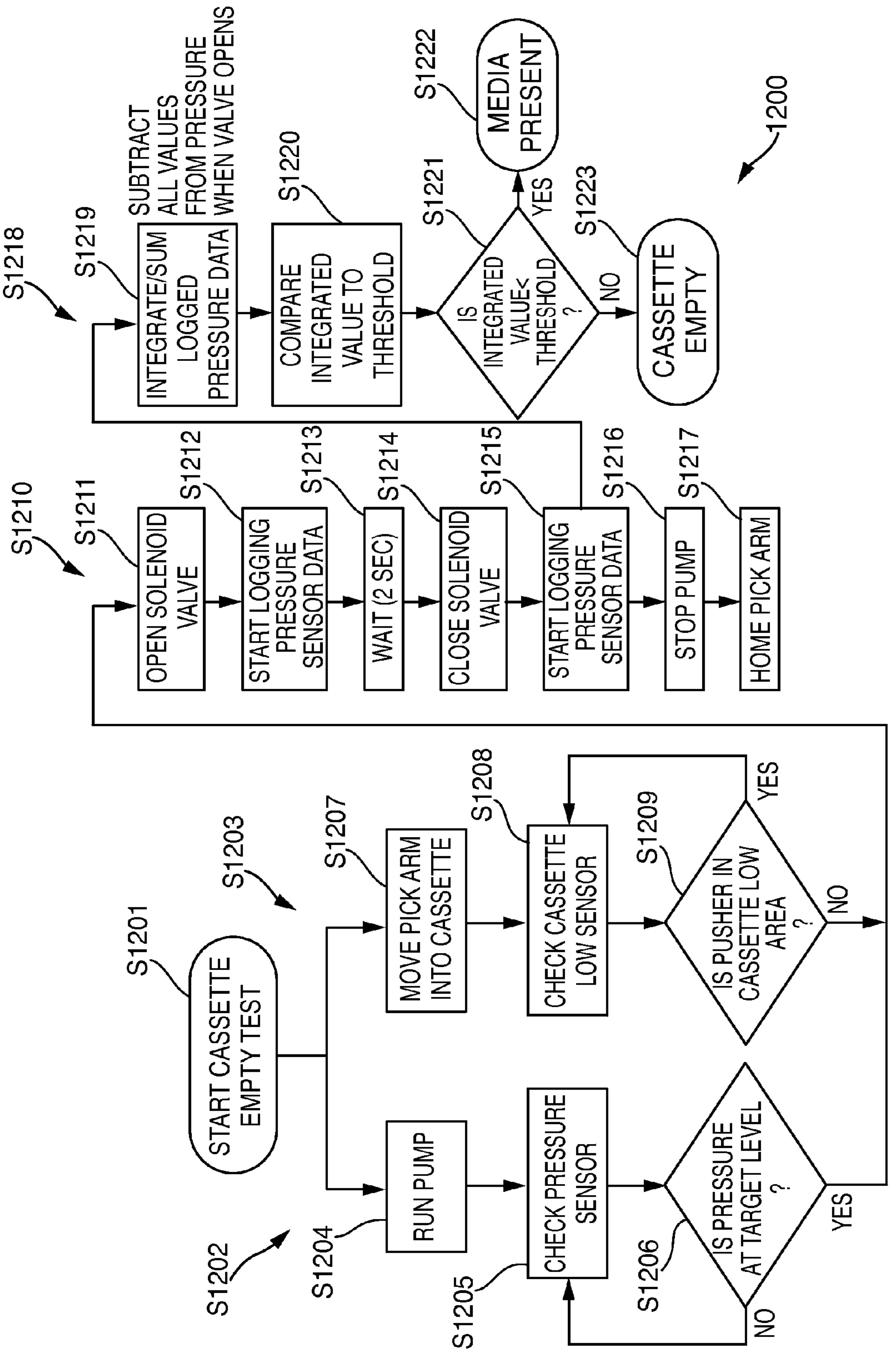
FIG. 12 illustrates condition determining.

FIG. 12 illustrates a test procedure 1200 using a cassette low sensor to determine when a container is low on contents. At step S1201 a start cassette empty test stage is initiated. This follows optionally from the S504 shown in FIG. 5. Simultaneously, two procedures, S1202, S1203 are carried out. The first of these sub-routine procedures S1202 includes the steps of running the pump S1204 and checking the pressure sensor S1205. The pressure sensor 227 is used to check the pressure. At step S1206 a determination is made as to whether the pressure attains a pre-determined target level. This helps establish that the vacuum pump 225 is working effectively and that there is no leak in the short length of tube 226 between the pump and the valve 228. Optionally, if this pressure does not reach a target limit within a pre-determined time, an alarm can be signaled indicating a fault. When the pressure reaches a target level an output from the sub-routine S1202 becomes active. The other sub-routine S1203 as illustrated in FIG. 12 is used to move the pick up arm to move a pusher plate out of the cassette low area. Once the cassette low sensor changes state it is known that contact has been made with the pusher and any media carried on the pusher. At step S1207 the pick up arm is moved. The cassette low sensor 208 is monitored to check whether an output is active or inactive. This is illustrated by step S1208. At step S1209 a determination is made as to whether or not the pusher is in the cassette low area. The pick up arm is driven until the pusher plate and any items of media carried thereon are pushed out of the cassette low area. This is indicated by the cassette low sensor output signal becoming inactive.

A data collection sub-routine S1210 is also illustrated in FIG. 12. The valve 228 is opened at step S1211 and pressure detected by the pressure detector 227 is logged over a period of time at step S1212. The pressure is logged for a pre-determined time period of two seconds at Step S1213. Optionally, aptly the time period can be one second or less. Aptly, optionally the time period may be five seconds or less. Aptly, optionally the time period may be 500 milliseconds or less.

Subsequent to the elapse of the pre-determined time, the valve 228 is closed at step S1214. The data collection logging pressure is stopped at step S1215. At step S1216 the pump 225 is stopped. And at step S1217 the pick up arm is returned to a home position.

FIG. 12 also illustrates a data processing sub-routine S1218. At step S1219 the logged pressure data is integrated or, optionally summed as previously described. A comparison is then made at step S1220 to compare the integrated or summed value to a threshold value. If the integrated or summed value is less than a pre-determined threshold value, as illustrated by step S1221, it may be determined that media is present in the container. This is illustrated by condition S1222. If the integrated value is not lower than the pre-determined threshold, it is determined that a cassette is empty, illustrated by step S1223.

Figure 13:
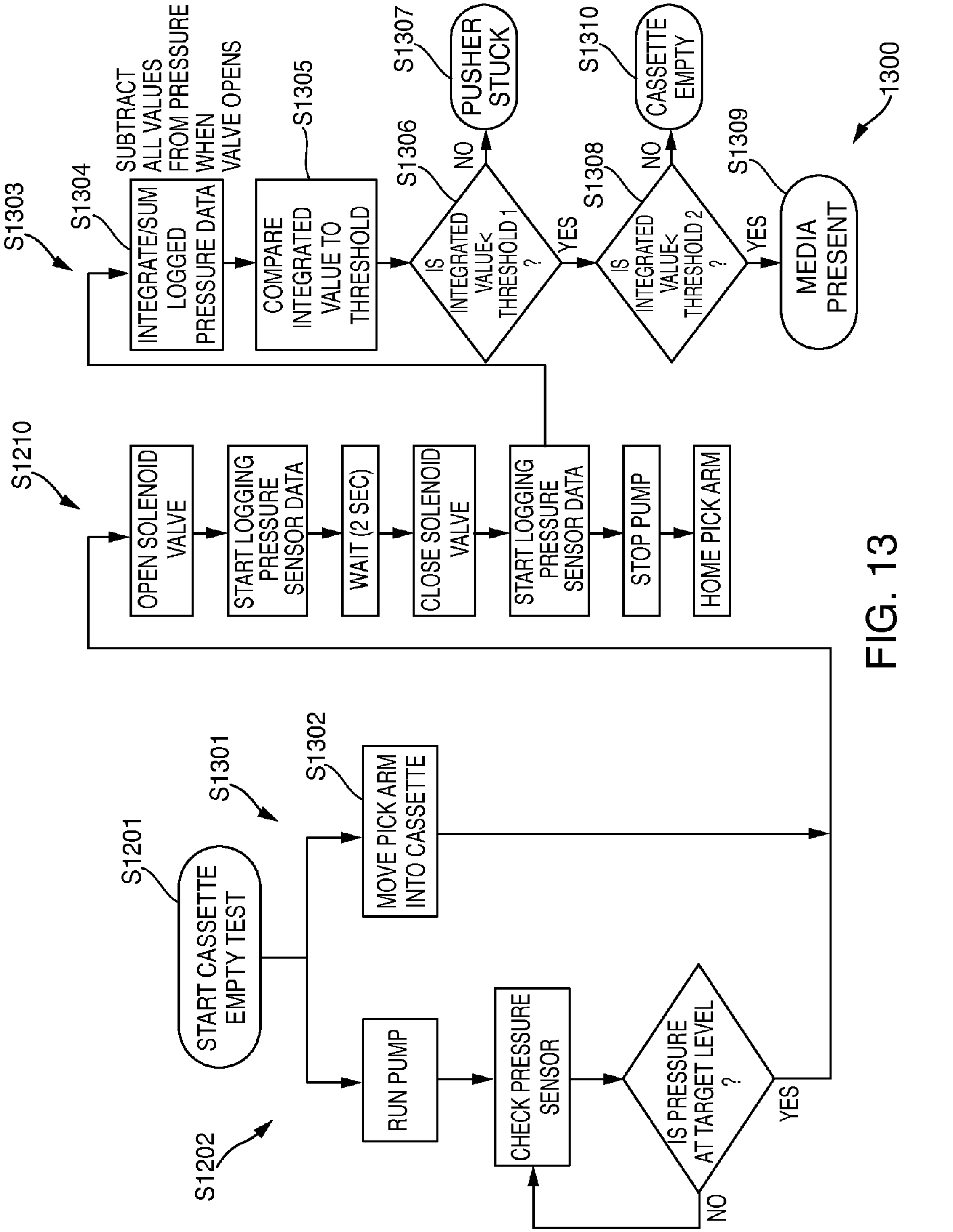
FIG. 13 illustrates condition determining.

FIG. 13 illustrates an alternative test procedure 1300 using smaller holes in the pusher plate. The test procedure 1300 differs from that described with respect to FIG. 12 in that, in an initial sub-routine S1301, the pick up arm is moved at step S1302 into the cassette container but no check is made to observe whether the pusher plate is in the cassette low area. The data collection sub-routine S1210 is similar to that shown in FIG. 12. The data processing sub-routine S1303 illustrates how the logged, that is to say, measured and stored pressure data, may be integrated or summed at step S1304. The integrated or summed value is then compared to a threshold value at step S1305. At step S1306 a determination is made as to whether or not the value is less than a first threshold. If not, then it can be determined that the pusher is stuck. This is illustrated by step S1307. A further determination is made at step S1308 as to whether the value is less than a second pre-determined threshold value. If the value is less than this second pre-determined threshold value, it may be determined that a media, that is to say, currency note or other item of media is present. This is illustrated by step S1309. If the value is not less than the second threshold value, then it can be determined that the container is empty. This is illustrated by step S1310.

Figure 14A:
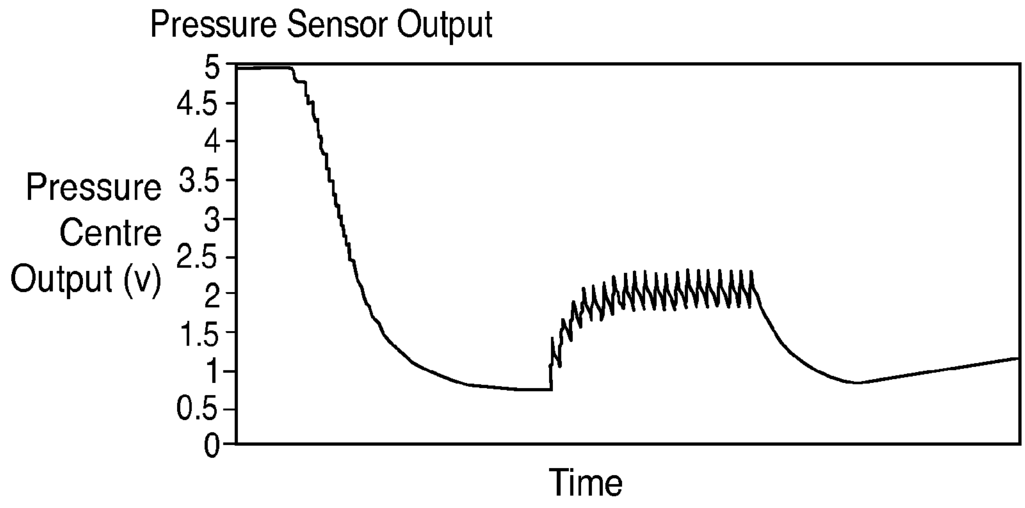
FIG. 14 illustrates determining a condition.
Figure 14B:
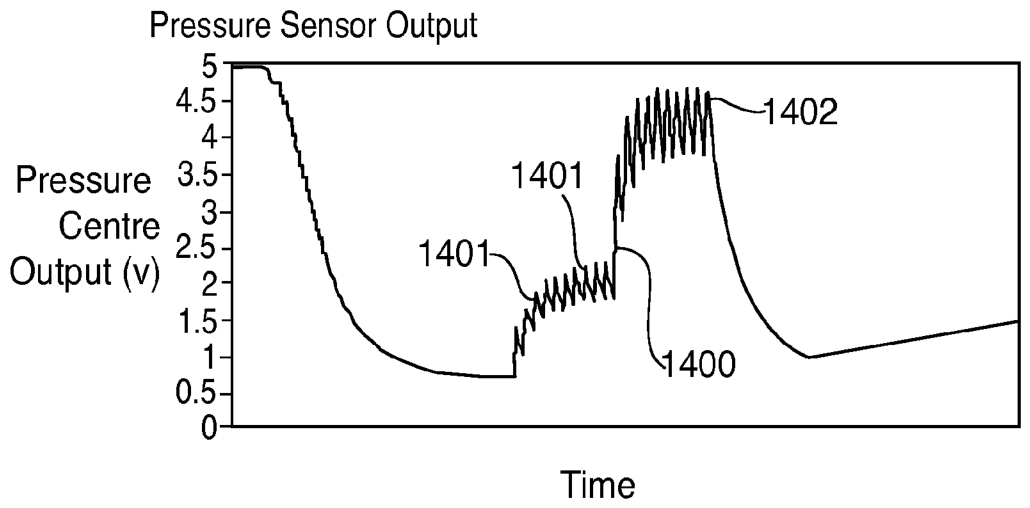

FIG. 14 illustrates how certain alternative embodiments of the present invention may measure the pressure at a suction cup and utilize a transition that is detected to indicate the onset of an empty condition in a cassette/container. As illustrated in FIG. 14, when items of media are contained in the container, the pressure measured subsequent to a valve open section remains relatively static but includes multiple peaks and troughs indicative of multiple pick operations (twenty shown in FIG. 14*a*) being carried out. The mean value of pressure may be utilized to determine a condition at the container. Alternatively, as shown in FIG. 14*b* which illustrates ten successful picks followed by a radical change in pressure and ten further unsuccessful attempts to pick. A difference may be utilized. That is to say, after the tenth successful pick it can be determined that the tenth successful pick picked the last item of media in the container. In the next attempted pick, the pressure measured is radically different from prior readings. This transition may be monitored and when detected may itself be utilized to indicate a cassette empty condition. The transition 1400 is illustrated in FIG. 14*b* subsequent to ten peaks 1401 measured as successful picks are carried out and then ten further peaks 1402 indicating a subsequent ten failed attempts to pick a currency note.

FIG. 15 illustrates an alternative automatic teller machine (ATM) 1500 in which the control module 1508 includes the functionality to determine one or more conditions in a container in the ATM. In other words, control module 1508 includes the functionality that was provided by the cassette status check control module 113 in ATM 100.

Although certain embodiments of the present invention have been described herein above with reference to a pusher plate with through holes, it will be understood that certain embodiments of the present invention can be utilized with a pusher plate with no through holes. Leak paths may of course be introduced without generating through holes through a pusher plate, for example, by providing channels extending centrally outwardly towards a peripheral edge of the pusher plate. Alternatively, according to certain embodiments of the present invention, no leak paths may be inbuilt in the pusher plate and the natural leakiness of the environment can be utilized to determine certain conditions at a container.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of operating a media container, the method comprising the steps of:

monitoring a first sensor signal indicative of whether the media container is in a low contents state;

locating a suction element at a pick up region of the media container;

selectively connecting a source of negative pressure to the suction element to pick a media item from the media container;

after a predetermined number of media item miss picks from the media container, determining if the media container is in a low contents state based upon the first sensor signal;

monitoring a second sensor signal indicative of pressure at the suction element; and electronically by a processor, logging pressure data based upon the second sensor signal after a determination has been made that the media container is in a low contents state and the predetermined number of media item miss picks from the media container has been attempted.

2. The method as claimed in claim 1, further comprising:

providing a respective integrated value or sum value by integrating or summing the logged pressure data between a first time and a second time;

comparing the integrated value or sum value to a predetermined threshold value; and concluding that the media container is empty when a determination is made that the integrated value or sum value is less than the predetermined threshold value.

3. The method as claimed in claim 1, further comprising:
providing a respective integrated value or sum value by integrating or summing the logged pressure data between a first time and a second time;
comparing the integrated value or sum value to a predetermined threshold value; and
concluding that a pusher plate mechanism of the media container is stuck when a determination is made that the integrated value or sum value is less than the predetermined threshold value.

4. The method as claimed in claim 1, further comprising:
locating a pick up arm carrying the suction element from a rest position to a pick position in which the suction element is located at the pick up region;
switching on a vacuum pump to thereby provide a source of negative pressure; and
subsequently opening a valve element to thereby selectively connect the source of negative pressure and the suction element.

5. The method as claimed in claim 1, wherein
the of media container is a currency cassette or sheet depository in an automatic teller machine (ATM).

6. A computer program product directly loadable into the internal memory of a digital computer, comprising software code portions for performing the steps of claim 1 when the product is run on a computer.

7. A method for determining a condition at an item of media container, comprising the steps of:
locating a suction element at a pick up region of an item of media container;
selectively connecting a source of negative pressure to the suction element;
determining a pressure at the suction element;
determining a condition of the container responsive to the determined pressure;
determining if an item of media container is in a low content state;
only determining said a condition if the item of media container is in the low contents state; and
if the container is in the low contents state, prior to determining said a condition, urging said suction element and/or a pick arm carrying said suction element in a direction towards a pusher plate in said container until a contents state sensor no longer indicates that the container is in the low contents state.

8. A method of operating a media container, the method comprising the steps of:
monitoring a first sensor signal indicative of whether the media container is in a low contents state;
locating a suction element at a pick up region of the media container;
selectively connecting a source of negative pressure to the suction element to pick a media item from the media container;
after a predetermined number of media item miss picks from the media container, determining if the media container is in a low contents state based upon the first sensor signal;
monitoring a second sensor signal indicative of pressure at the suction element;
electronically by a processor, logging pressure data based upon the second sensor signal after a determination has been made that the media container is in a low contents state and the predetermined number of media item miss picks from the media container has been attempted;
providing a respective integrated value or sum value by integrating or summing the logged pressure data between a first time and a second time;
comparing the integrated value or sum value to a first predetermined threshold value;
concluding that a pusher plate mechanism of the media container is stuck when a determination is made that the integrated value or sum value is less than the first predetermined threshold value;
comparing the integrated value or sum value to a second predetermined threshold value; and
concluding that the media container is empty when a determination is made that the integrated value or sum value is less than the second predetermined threshold value.

9. The method as claimed in claim 8, further comprising:
locating a pick up arm carrying the suction element from a rest position to a pick position in which the suction element is located at the pick up region;
switching on a vacuum pump to thereby provide a source of negative pressure; and
subsequently opening a valve element to thereby selectively connect the source of negative pressure and the suction element.

10. The method as claimed in claim 8, wherein
the media container is a currency cassette or sheet depository in an automatic teller machine (ATM).

11. A computer program product directly loadable into the internal memory of a digital computer, comprising software code portions for performing the steps of claim 8 when the product is run on a computer.

* * * * *